W. PENDZIWIATER.
DIRECTION INDICATOR FOR DIRIGIBLE VEHICLES.
APPLICATION FILED NOV. 8, 1919.
1,337,848.
Patented Apr. 20, 1920.
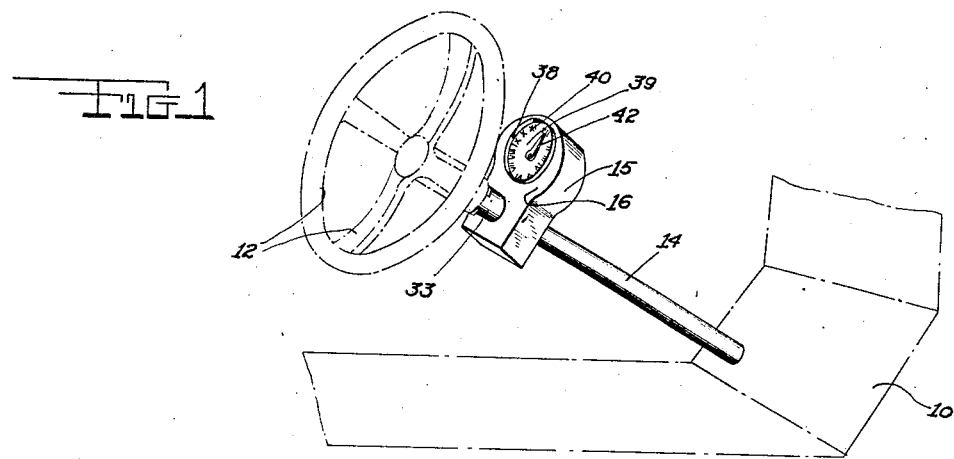
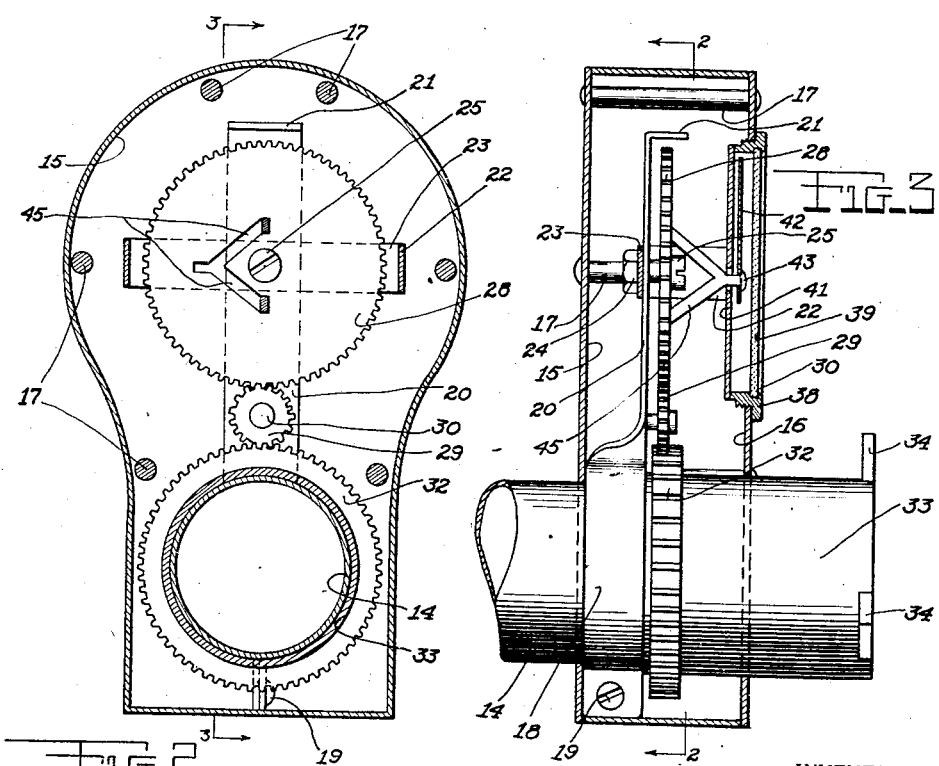
INVENTOR.
Wawrzyniec Pendziwiater
BY *Jerry C. Heinicke*
ATTORNEY.

UNITED STATES PATENT OFFICE.

WAWRZYNIEC PENDZIWIATER, OF PHILADELPHIA, PENNSYLVANIA.

DIRECTION-INDICATOR FOR DIRIGIBLE VEHICLES.

1,337,848.  Specification of Letters Patent.  Patented Apr. 20, 1920.

Application filed November 8, 1919. Serial No. 336,676.

*To all whom it may concern:*

Be it known that I, WAWRZYNIEC PENDZIWIATER, a citizen of Poland, residing at Philadelphia, county of Philadelphia, and State of Pennsylvania, have invented certain new and useful Improvements in Direction-Indicators for Dirigible Vehicles, of which the following is a specification.

This invention has as its object the provision of means for indicating the turning angle of a dirigible vehicle, as an automobile, so that the same may be seen by the operator.

A further object is to provide such means in forms which may be readily attached to the steering post of a vehicle in a secure manner and without material change in the parts to which it is applied.

These objects are attained by the novel construction, combination and arrangement of parts hereinafter described and shown in the accompanying drawings, forming a material part of this disclosure, and in which—

Figure 1 is a perspective view of a direction indicator made in accordance with the invention and indicating its application.

Fig. 2 is a vertical sectional view of the indicator, the section being taken on line 2—2 of Fig. 3, and Fig. 3 is a similar sectional view, taken on another plane, on line 3—3 of Fig. 2.

Referring to the drawings in detail, the numeral 10 designates a conventional type of automobile foot-board, through which passes the steering post surmounted by the operating handwheel 12.

Surrounding the post is a tubular sleeve 14 to which is attached a hollow casing 15 having a cover 16 engaged permanently by a plurality of rivet studs 17.

Fixed to the sleeve 14, within the casing, is a sheet metal bracket 18, its extending end being clamped by the screw 19, while its opposite end 20 is reduced in width, its side edge being parallel and bent at a right angle, forming an end guard 21.

Similar side guards 22 are formed with a strip 23 held to the back of the bracket element 20 by a nut 24 threaded to the end of a pivot screw 25 which also serves as a journal for a spur gear 28.

This gear is engaged with an intermediate pinion 29 rotatable on a headed stud 30 set in the bracket 20.

Rotary motion is communicated to the pinion 29 by a spur gear 32 fixed on the inner extending end of a sleeve 33, the outer end of which carries a pair of laterally extending lugs 34 adapted to engage with a projection extending down from the hub of the hand wheel 12 so that as it is rotated, it conveys motion to the gear train.

Set in the cover plate 16 of the casing is a circular ring 38 having a transparent cover 39, through which are visible an annular row of numerals 40 disposed on an opaque dial 41 forming the rear wall of the ring 38.

A hand or pointer 42 is rotatable over the dial, the pointer being carried by a stem 43 passing through a central opening in the dial and formed with a yoke or bracket 45 fixed to the outer face of the gear 28 thereby providing means for actuating the pointer when the hand wheel is turned.

From the foregoing it will be seen that a neat appearing and effective apparatus has been disclosed whereby the motion of the steering wheel and consequent action of the front wheels of a vehicle may be seen correctly indicated.

Having thus described my invention what I claim as new and desire to secure by Letters Patent, is—

In a direction indicator for dirigible vehicles, the combination with the steering post and hand-wheel of the vehicle, of a stationary sleeve through which said post passes, a second sleeve rotatable on the upper end thereof, operative connections between said hand-wheel and said second sleeve, a casing secured to said stationary sleeve, a bracket in said casing, a gear train in said casing, said gear train being driven by said second sleeve, a transparently covered dial on said casing, a pointer movable thereover, and a yoke connection between said pointer and said gear train, whereby the movement of said hand wheel is indicated on said dial.

In testimony whereof I have affixed my signature.

WAWRZYNIEC PENDZIWIATER.